US007803070B2

(12) United States Patent
Inoue et al.

(10) Patent No.: US 7,803,070 B2
(45) Date of Patent: Sep. 28, 2010

(54) GOLF BALL AND GOLF BALL MOLD

(75) Inventors: Michio Inoue, Chichibu (JP); Hiroyuki Ono, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 518 days.

(21) Appl. No.: 11/392,586

(22) Filed: Mar. 30, 2006

(65) Prior Publication Data

US 2007/0232411 A1  Oct. 4, 2007

(51) Int. Cl.
*A63B 37/12* (2006.01)

(52) U.S. Cl. .................................... 473/378

(58) Field of Classification Search ......... 473/378–385
See application file for complete search history.

(56) References Cited

U.S. PATENT DOCUMENTS

| | | | | |
|---|---|---|---|---|
| 4,869,512 A | * | 9/1989 | Nomura et al. | 473/383 |
| 5,547,197 A | * | 8/1996 | Pocklington | 473/384 |
| 5,885,173 A | * | 3/1999 | Keller | 473/385 |
| 6,050,803 A | | 4/2000 | Omura et al. | |
| 6,179,732 B1 | * | 1/2001 | Inoue et al. | 473/409 |
| 6,231,459 B1 | * | 5/2001 | Pettigrew et al. | 473/351 |

FOREIGN PATENT DOCUMENTS

| | | |
|---|---|---|
| JP | 10-175219 A | 6/1998 |
| JP | 11-089966 A | 4/1999 |

\* cited by examiner

*Primary Examiner*—Raeann Trimiew
(74) *Attorney, Agent, or Firm*—Sughrue Mion, PLLC

(57) ABSTRACT

The invention provides a golf ball manufactured using a mold having a top half and a bottom half, which ball has formed on a surface thereof, near a seam line corresponding to a parting line between the top and bottom halves of the mold, a recessed and/or raised mark serving as an indicator for detecting the direction or position of the seam line. The invention also provides a golf ball mold composed of a top half and a bottom half that detachably join together so as to form therein a spherical cavity into which a material is injected to mold a golf ball, which mold bears, near a parting line between the top and bottom halves on a wall of the cavity, a raised or recessed feature for forming a mark as an indicator for detecting the direction or position of the parting line. The invention enables the direction and position of the seam line on the surface of the ball to be easily identified and enables the subsequent steps of visually inspecting the ball and applying indicia to the surface of the ball to be carried out more smoothly and advantageously, making it possible in particular to greatly shorten the time devoted to these operations.

33 Claims, 9 Drawing Sheets

GOLF BALL AND GOLF BALL MOLD

BACKGROUND OF THE INVENTION

The present invention relates to golf balls, such as one-piece golf balls, solid golf balls composed of a core enclosed by one or more cover layer, and thread-wound golf balls. The invention also relates to molds for molding such golf balls.

Horizontally separating two-part molds have hitherto been used as molds for injection molding a cover resin material over a core in the manufacture of golf balls. When such a two-part mold is used, a seam line corresponding to the parting line of the mold appears on the golf ball.

This seam line is convenient for visually inspecting the golf ball and for applying indicia to the ball. For example, flash normally forms at the seam line corresponding to the parting line of the two-part mold. By placing the ball in a buffing apparatus so that the seam line prior to deflashing is centrally positioned, buffing can be efficiently carried out. It is thus important to know where the seam line is located, and to position the ball accordingly.

When an indicia such as lettering, a design or a trade mark is applied onto the seam line of a golf ball, it is essential to know the position of the seam line beforehand.

However, to improve the aerodynamic properties and increase the distance of travel in recent golf balls, and to make the arrangement of dimples formed on the surface of the ball as dense and uniform as possible, it has become common practice to place a plurality of dimples across the parting line. This has made it impossible to clearly distinguish, as a belt, the seam line on the surface of the ball which is left when the ball is molded in a two-part mold and which corresponds to the parting line of the mold. As a result, in subsequent steps, it has been difficult to smoothly and efficiently carry out such operations as visual inspection of the golf ball and the application of indicia at specific positions.

SUMMARY OF THE INVENTION

It is therefore an object of the present invention to provide a golf ball having on the surface thereof a seam line the position and direction of which can be easily distinguished, enabling work in the subsequent operations of visually inspecting the ball and applying indicia to the surface of the ball to be carried out smoothly and advantageously. Another object of the invention is to provide a mold for manufacturing such a golf ball.

Accordingly, in a first aspect, the invention provides a golf ball manufactured using a mold having a top half and a bottom half, which ball has formed on a surface thereof, near a seam line corresponding to a parting line between the top and bottom halves of the mold, a recessed and/or raised mark serving as an indicator for detecting the direction or position of the seam line.

Preferred embodiments of the golf ball of the invention include I to IX below, in which:

I. The golf ball has one or more mark on top and bottom portions of the ball on either side of the seam line;
II. If the seam line represents 0° latitude, the mark is disposed on the golf ball surface within a range in latitude of 1° to 45°;
III. The golf ball is divided into two hemispheres by the seam line, wherein marks on the respective hemispheres are disposed so as to be substantially equally spaced apart relative to an axis of rotation circumscribed by the seam line;
IV. The golf ball is divided into a first and a second hemisphere by the seam line, wherein marks on the first hemisphere exist in a relative arrangement with marks on the second hemisphere such that the marks on the first hemisphere are separated from the marks on the second hemisphere at a given angle of from 20° to 40° relative to an axis of rotation circumscribed by the seam line;
V. The mark is formed on a surface of a dimple and/or land area on the ball;
VI. The mark is composed of one simple symbol;
VII. The mark has a size of at most 4.0 mm by 4.0 mm;
VIII. The mark has a height or depth of 5 to 200 μm;
IX. A raised mark is formed within a dimple on the surface of the ball and has a height set so that the mark does not extend above an edge of the dimple.

To achieve the above objects of the invention, the invention provides, in a second aspect, a golf ball mold having a top half and a bottom half that detachably join together so as to form therein a spherical cavity into which a material is injected to mold a golf ball, which mold bears, near a parting line between the top and bottom halves on a wall of the cavity, a raised or recessed feature for forming a mark as an indicator for detecting the direction or position of the parting line.

In the golf ball and the golf ball mold of the invention, by having the mold bear a mark-forming raised or recessed feature near a parting line between the top and bottom halves that detachably join together to form a spherical cavity, and on the wall of the spherical cavity, a recessed and/or raised mark can be formed on the surface of the molded ball. Moreover, by placing this mark near the seam line on the surface of the ball, the mark can be quickly recognized, enabling the direction and position of the seam line to be analyzed in a short period of time from information displayed by the mark, and enabling a ball positioning operation centered on the seam line to be smoothly and efficiently carried out.

The marks and the mark-forming raised or recessed features corresponding thereto in the present invention differ from commonly used markings. For example, the markings described in JP-A 10-175219 and JP-A 11-089966 are displayed as information for use by the manufacturer, such as the date of manufacture and the plant where the ball was made. Such markings are generally composed of about three letters such as alphanumeric characters, and are randomly placed on the surface of the ball. By contrast, as noted above, the purpose of forming the marks in the present invention and the configuration of those marks differ from those in the prior art.

BRIEF DESCRIPTION OF THE DIAGRAMS

Figure 6A:
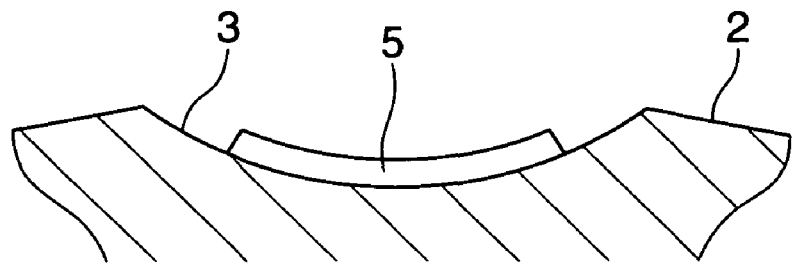
Figure 6B:
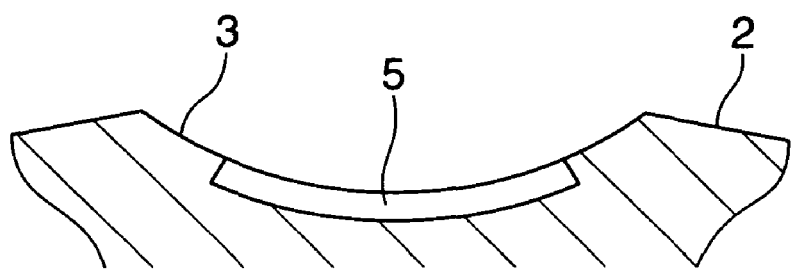
Figure 6C:
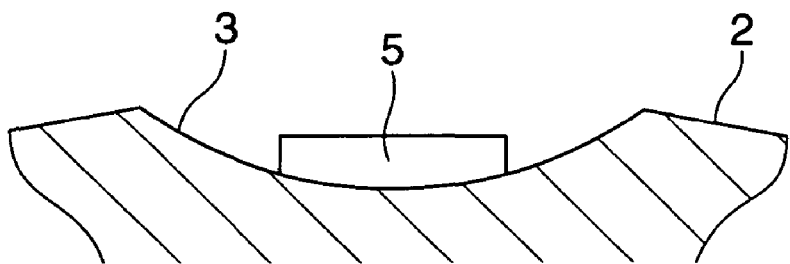
Figure 6D:
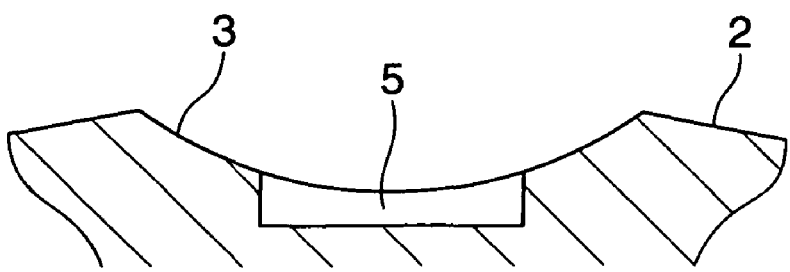
Figure 7A:
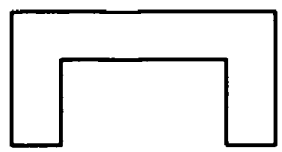
Figure 7B:
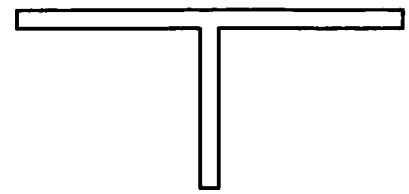
Figure 7C:
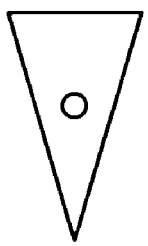
Figure 7D:
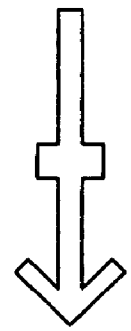
Figure 7E:
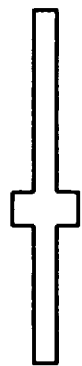

FIGS. 6(A) and (B) are schematic sectional views showing examples in which a mark has a top or bottom face with a shape that follows the shape of a dimple; and FIGS. 6(C) and (D) are schematic sectional views showing examples in which a mark has a top or bottom face with a shape that does not follow the shape of a dimple.

FIG. 7 shows schematic top views of different types of marks.

Figure 8A:
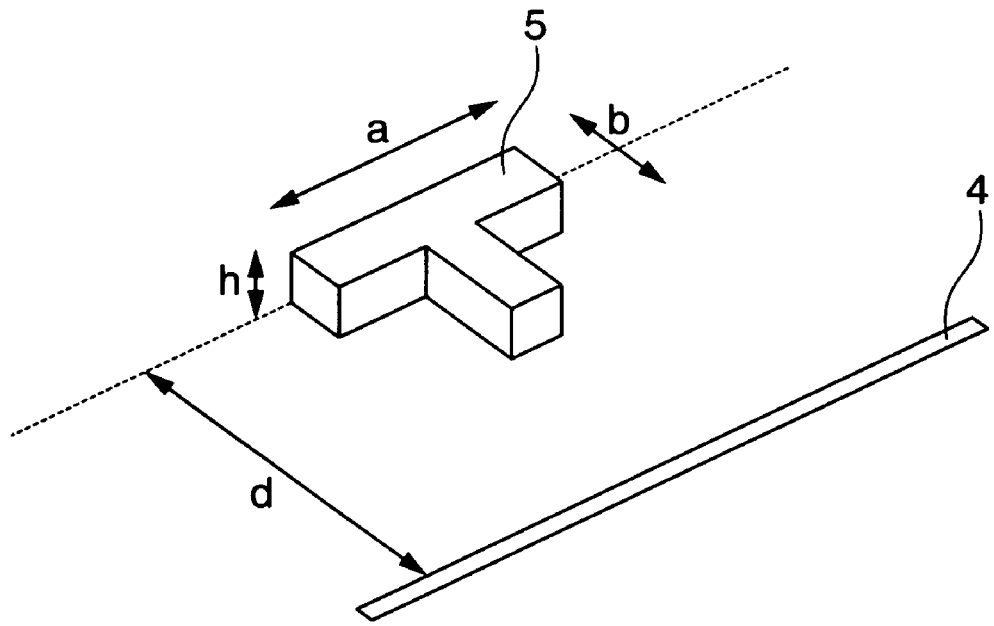
Figure 8B:
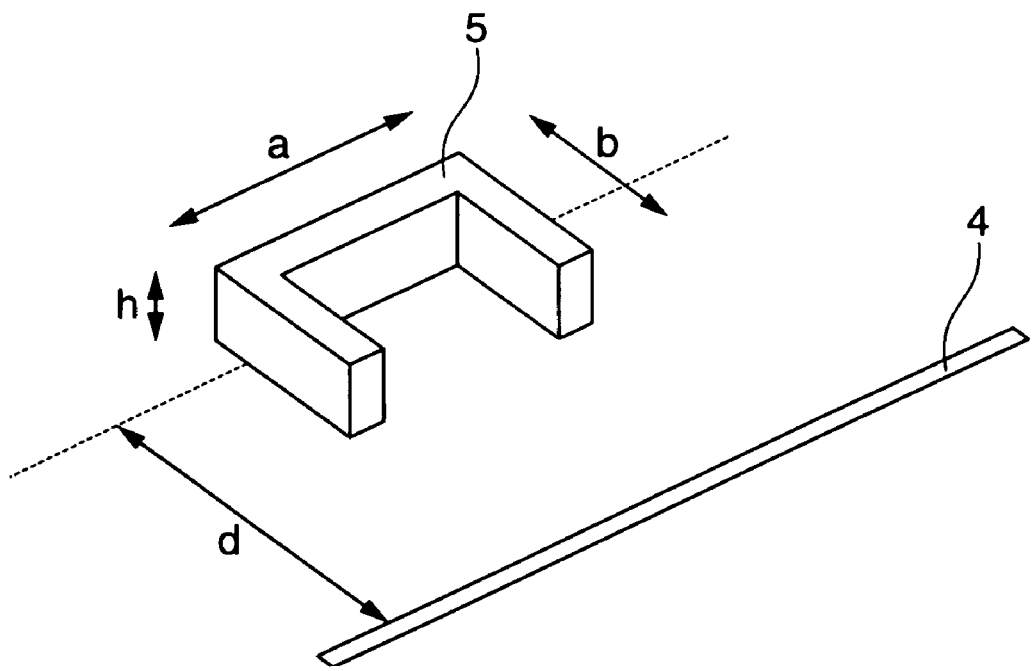

FIG. 8 shows schematic perspective views illustrating the shapes of marks.

Figure 9:
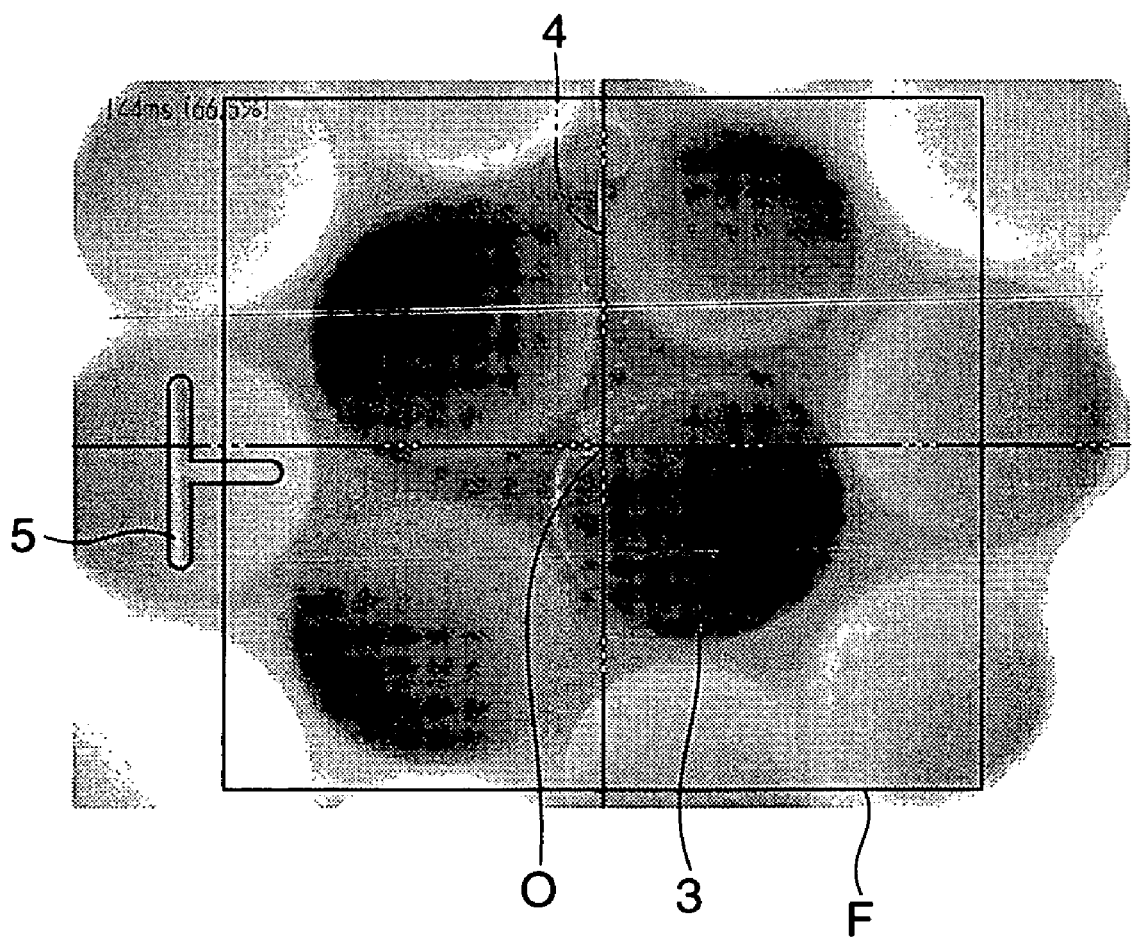

FIG. 9 is an image of the surface of a ball, as taken from above with a camera.

DETAILED DESCRIPTION OF THE INVENTION

The invention is described below in conjunction with the attached diagrams.

Figure 1:
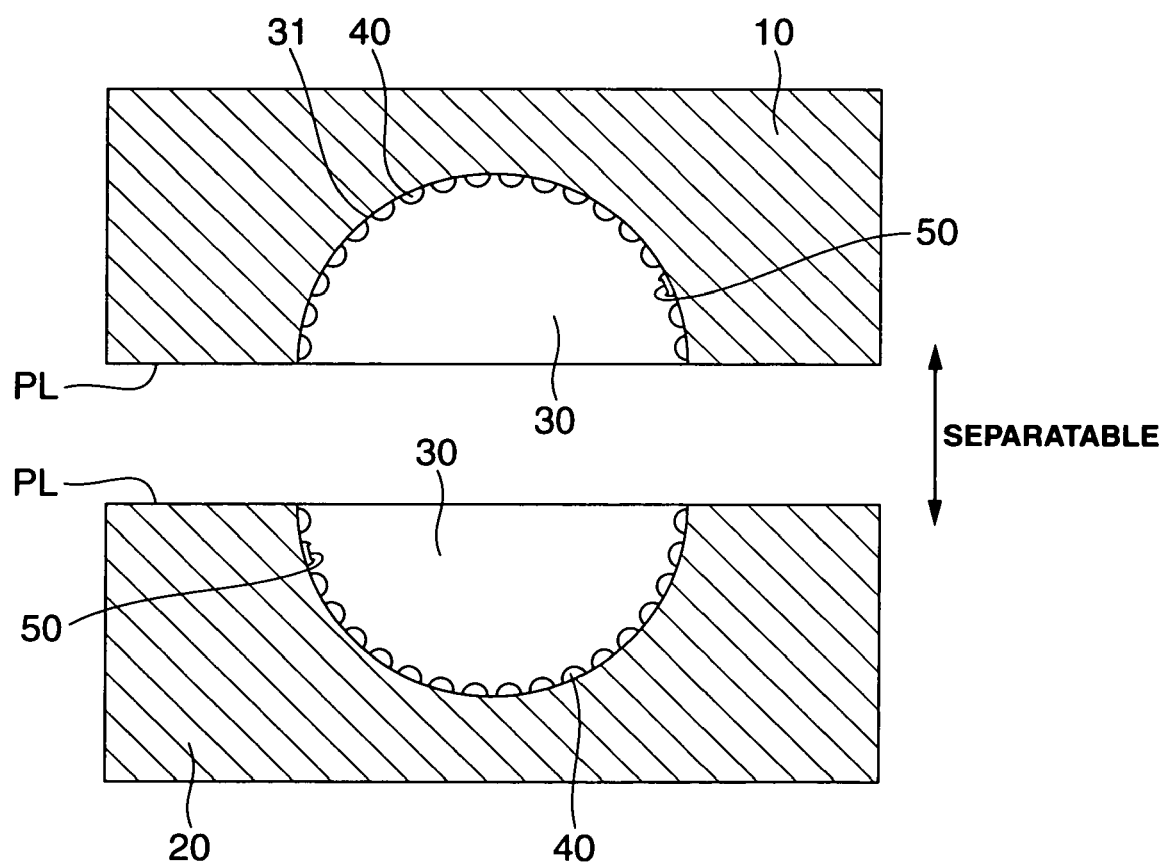
FIG. 1 is a schematic sectional view of a golf ball mold according to the present invention.

FIG. 1 is schematic sectional view showing an embodiment of the golf ball mold of the invention. The mold has a top half 10 and a bottom half 20 which detachably join together so as to form at the interior a spherical cavity 30. The cavity 30 bears numerous dimple-forming projections 40 on an inside wall 31 thereof. Raised or recessed features 50 for forming marks are provided on the cavity wall 31 near the parting lines PL of both mold halves. Elements such as runners, gates, support pins and vent pins typically disposed around the cavity 30 are omitted in FIG. 1, but the types, numbers and arrangement of such elements may be treated in the same way as in the prior art.

Figure 2:
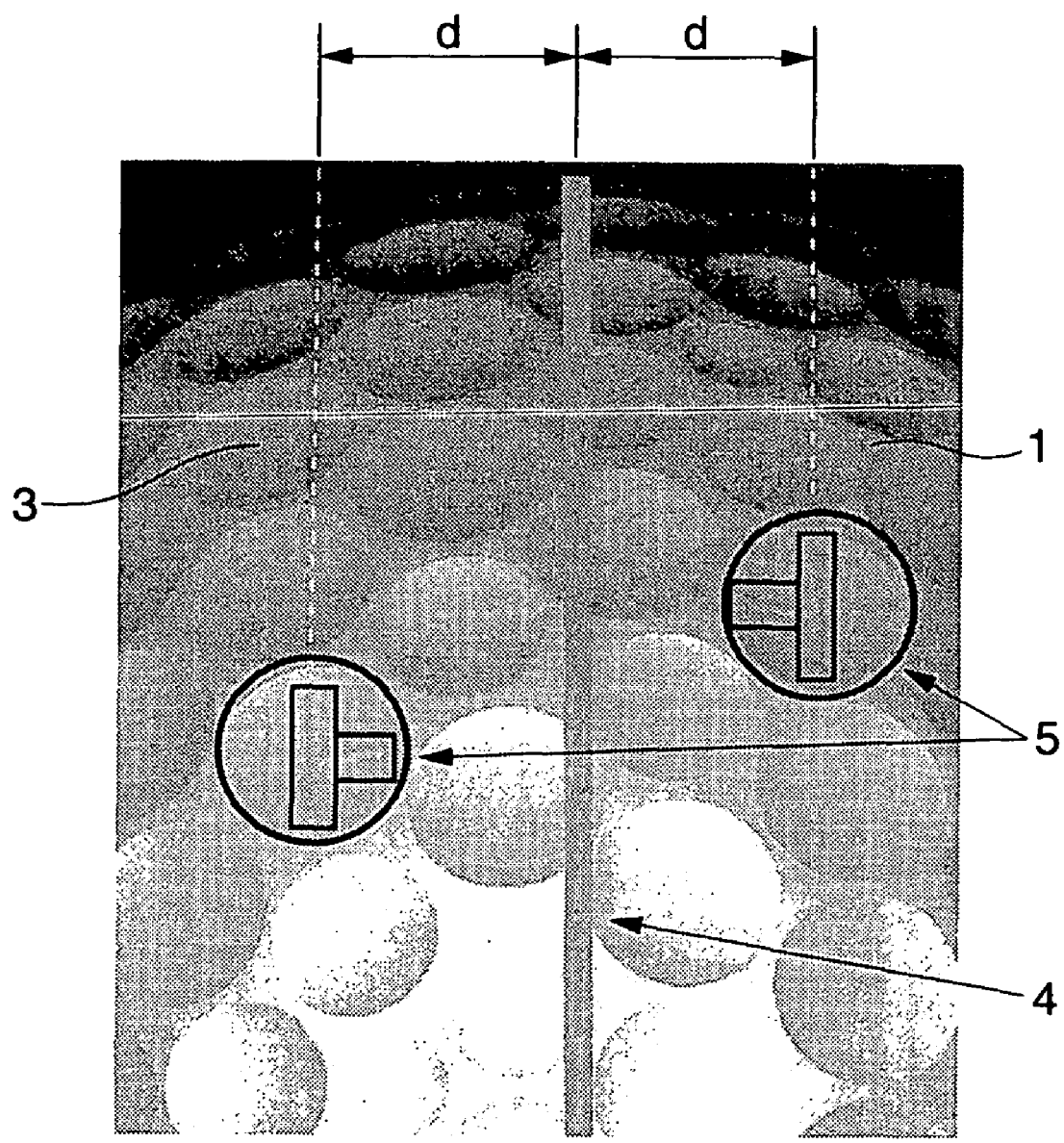
FIG. 2 shows the surface of a golf ball formed with the golf ball mold of the invention.

One distinctive characteristic of the inventive golf ball mold is the presence of mark-forming raised or recessed features 50. These mark-forming features 50 function as indicators for easily detecting the seam line 4 that appears on the surface 1 of the golf ball (molded body) after injection molding with the two-part mold composed of a top half and a bottom half. Moreover, as shown in FIG. 2, in a golf ball that has been molded using the golf ball mold of the invention, a plurality of marks 5 corresponding to the mark-forming features are formed on the ball surface 1 on which numerous dimples 3 have been formed. These marks 5 are detected and, based on their shapes, the direction and position of the seam line 4 are determined.

The number of mark-forming raised or recessed features 50 for each of the top half 10 and the bottom half 20 of the mold may be set to at least one, although it is advantageous for this number to be preferably at least three but not more than six, and most preferably not more than four. It is preferable for these mark-forming features 50 to be disposed at substantially equal intervals on substantially the same latitude. When the ball is inspected from directly above with a CCD or other type of image processing camera, in order for at least one mark 5 to be identified and detected regardless of the direction from which the ball is viewed, it is desirable that the mold bear numerous mark-forming raised or recessed features 50 corresponding to the marks 5. However, too many such features 50 may compromise the desirable effects of the dimples 3 on the aerodynamic properties of the ball, and may hinder the efficient removal of the molded object (golf ball) from the mold after molding.

Figure 3:
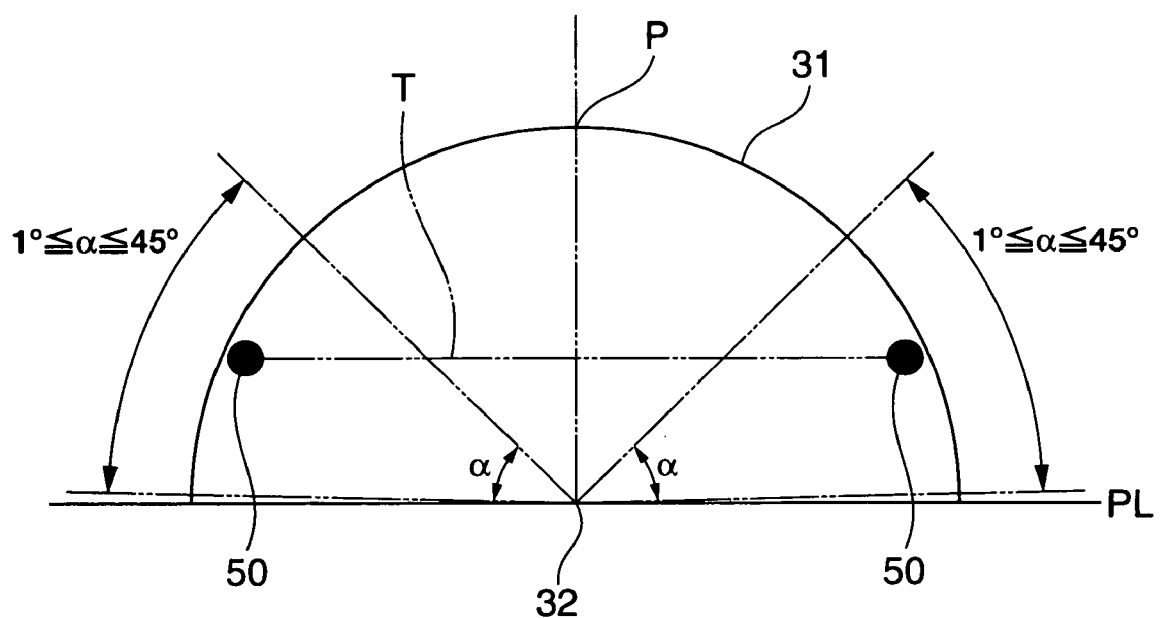
FIG. 3 shows the relative arrangement of marks when the surface of the golf ball is viewed from the direction of the seam line.

Referring to FIG. 3, letting the parting line PL in the spherical cavity where the mold halves meet represent the equator (0° latitude), it is preferable for the mark-forming raised or recessed features 50 to be placed within a range in the latitude a of from 10 to 45°, and more preferably from 4° to 30°. By placing the mark-forming features 50 near the parting line PL in the cavity 30 within this range, the position of the seam line on the ball can be easily determined. The symbol P in FIG. 3 indicates the ball polar direction in the spherical cavity.

When a plurality of mark-forming raised or recessed features 50 are placed on the top half or the bottom half of the mold, as shown in FIG. 3, it is desirable for all of the mark-forming features 50 to be disposed along the same latitude T. This makes the distance between the mark-forming features 50 and the seam line 4 uniform, resulting in stable precision when identifying and measuring the mark-forming features 50, and also enables positioning of the seam line to be easily and rapidly carried out.

Figure 4:
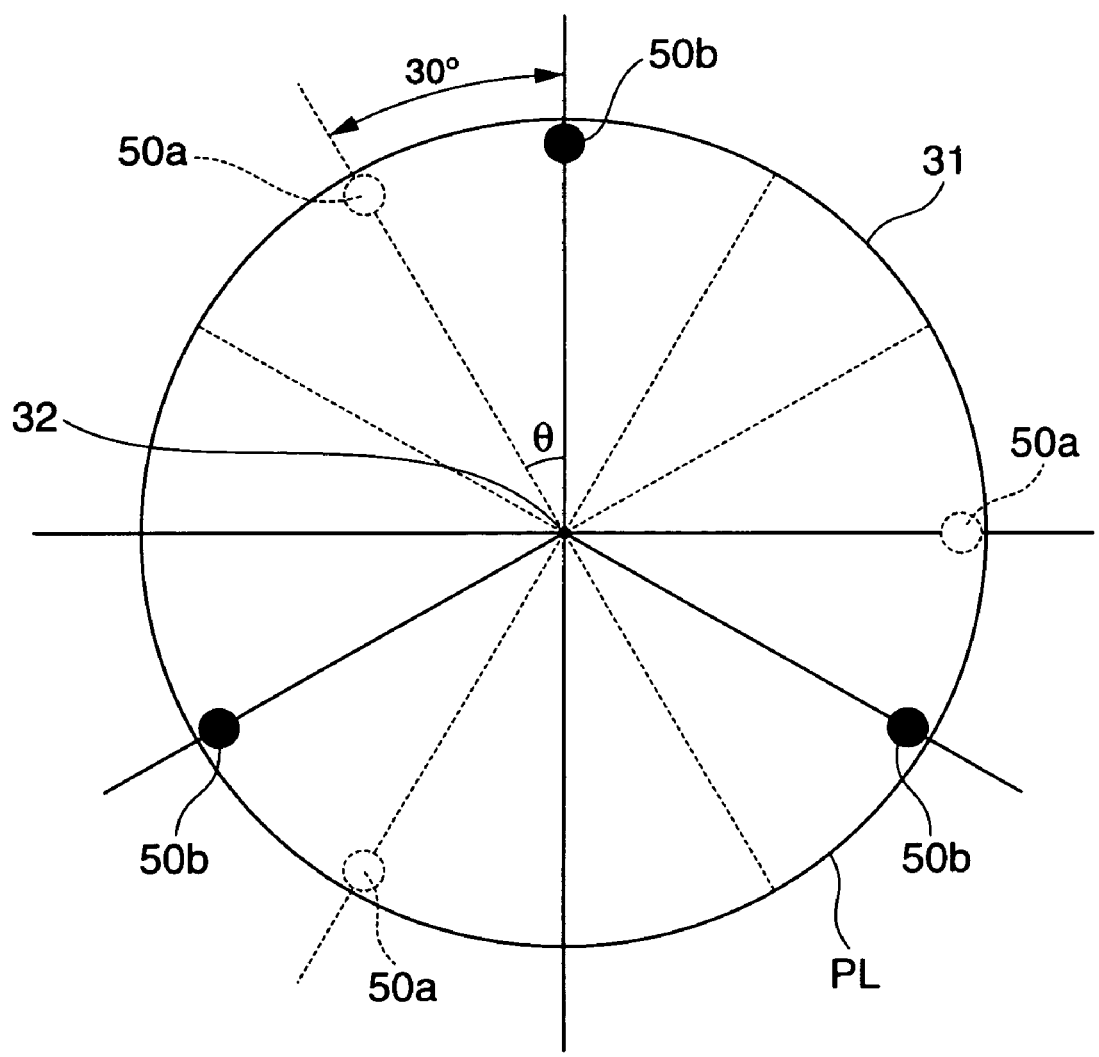
FIG. 4 shows the relative arrangement of marks when the surface of the golf ball is viewed from a polar direction.

Moreover, when a plurality of mark-forming raised or recessed features 50 are formed on the mold, the relative arrangement of the various mark-forming features 50 is preferably such that, referring to FIG. 4, the angle of intersection θ between line segments which connect the respective mark-forming features 50 with the center 32 of the spherical cavity 30 is set to 30° or 60°. This angle θ is the angle on a circle defined by the cavity wall at the mold parting line. For example, in FIG. 4, the relative arrangement of mark-forming features on a top mold half 10 as seen from the polar direction is shown as solid lines, and the relative arrangement of mark-forming features on the bottom mold half 20 is shown as dotted lines. Here, three mark-forming features 50a are arranged at intervals of about 120° on the same latitude of the top mold half 10, and three mark-forming features 50b are similarly arranged at intervals of about 120° on the bottom mold half 20. If the respective arrangements of mark-forming features 50a and 50b on the top and bottom mold halves are aligned in the vertical direction, the mark-forming features 50b on the bottom mold half 20 represented by dotted lines in FIG. 4 will be obscured by the mark-forming features 50a in the top mold half 10 represented by solid lines. As a result, when an image of the ball surface is taken from directly above with a camera, it may be impossible to carry out the rapid detection and identification of the marks 5 molded on the surface of the ball. Therefore, by having the respective arrangements of mark-forming raised or recessed features on the top and bottom mold halves offset as shown in FIG. 4 by a given angle θ of preferably 20° to 40°, and more preferably 25° to 35°, the mark detecting accuracy and mark identifying accuracy are enhanced, making it possible to rapidly and efficiently determine the direction and position of the seam line molded on the surface of the ball. That is, when an attempt is made to find the marks on a ball by rotating the ball in one direction, marks located near the axis of rotation and support are sometimes not recognized. However, if the camera is installed at a position 90° to the axis of rotation and the field of view is set to 30°, even should one mark happen to coincide with the axis of rotation, one or another of the marks on a meridian will inevitably appear within the camera's field of view in the course of a single turn about the axis of rotation. As a result, the precision of mark detection can be increased with a smaller number of marks 5.

Figure 5:
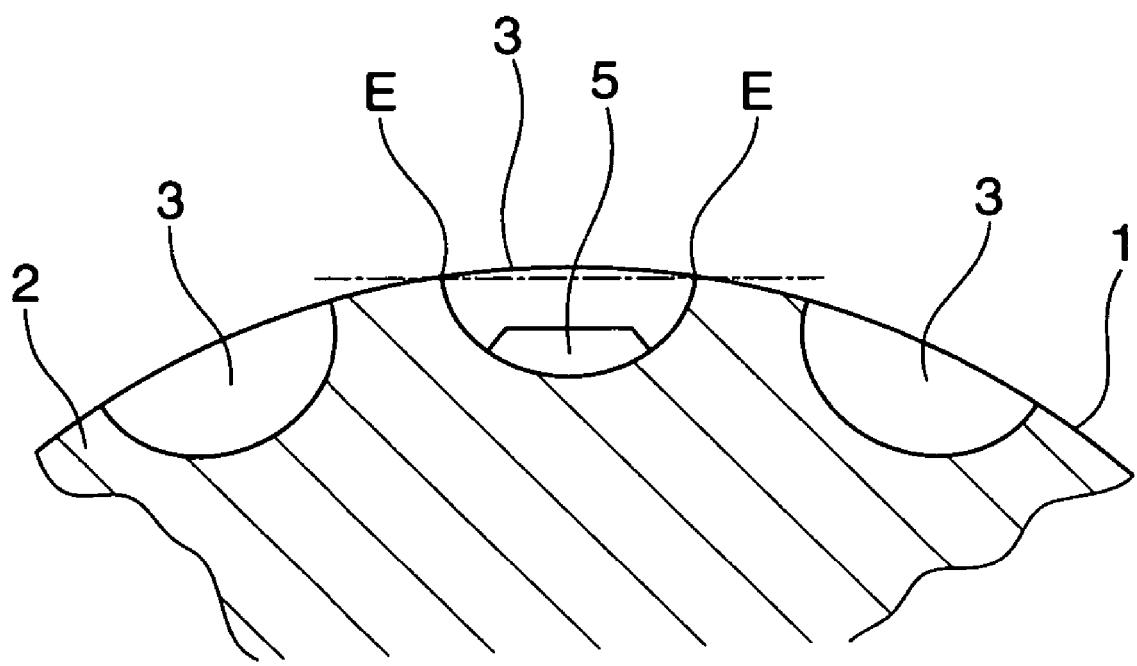
FIG. 5 is a partial sectional view showing a mark formed in the recessed region of a dimple.

The mark-forming raised or recessed features on the cavity wall 31 may be provided in places on the cavity wall which correspond to lands 2 on the golf ball, or in places on the cavity wall with correspond to dimples. In particular, because the recessed portion of a dimple 3 has a relatively large surface area that is sufficient to accommodate a raised or recessed feature, it is preferable to provide the mark-forming features 50 on the cavity wall of the mold so that the marks 5 formed thereby are disposed within the recessed portions of dimples. As a preferred mode for placing a mark 5 within the recessed portion of a dimple 3, referring to FIG. 5, it is recommended that the mark 5 formed within the dimple 3 have a height which does not extend above a line connecting the edges E, E of the dimple. If a mark is provided which protrudes above the edge E, E of the dimple, part or all of the mark may be unintentionally removed when the surface of the ball is buffed after molding.

It is preferable for the mark 5 to have a shape which follows the shape of a dimple and/or land area. That is, a mark 5 can have a top face shape or a bottom face shape which does or does not follow the shape of a dimple or land area. In the practice of the invention, the mark 5 may have any of these shapes. Illustrative examples include cases in which, referring to FIGS. 6(A) and (B), the mark 5 has a top face shape or bottom face shape which follows the shape of a dimple 3, and cases in which, referring to FIGS. 6(C) and (D), the mark 5 has a top face shape or bottom face shape which does not follow the shape of a dimple 3. Of these, it is especially preferable for the mark 5 to have a top face shape or bottom face shape that follows the shape of the dimple 3. The marks 5 in FIGS. 6(A) and (C) are raised marks which project out from the floor of the dimple, and the marks 5 in FIGS. 6(B) and (D) are raised marks which are embedded in the base of the dimple.

The mark-forming raised or recessed features 50 are composed of symbols from which the circumferential direction can be discerned, enabling the position of the seam line 4 to be determined from the marks 5 molded on the ball surface 1. It is preferable for such mark-forming features 50 to have directional components aligned with the latitude and longitude. Illustrative examples include the symbols shown in FIG. 7(A) to (E). Generally, when the surface of a golf ball is visually inspected with an image processing camera, if there are numerous alphabetic characters, for example, it takes a while to recognize these, as a result of which it takes too much time to inspect a large number of golf balls. By contrast, in this invention, unlike conventional marks which typically display product information, the shapes of the marks 5 are recognized in a short time and, based upon information such as the shapes and positions of the marks 5, the task of determining the direction and location of the seam line is rapidly and efficiently carried out.

FIG. 8 shows marks shaped approximately as the letter "T" and an angular letter "U" that have been molded on a surface 1 of a ball. The direction of the seam line on the ball is indicated by shape of the letter in terms of latitude (a direction) and longitude (b direction). The distance d between the mark 5 and the seam line 4 is from 1.1 to 15.1 mm, and preferably from 1.4 to 10.7 mm. The direction of the seam line is apparent from the shape of such a mark, and the distance of the seam line from the mark can be determined from this mark information.

The mark-forming raised or recessed features 50, while not subject to any particular size limitation, typically have a size, expressed as the length by width of the shape, which is preferably not more than 4.0 by 4.0 mm, more preferably not more than 3.0 by 3.0 mm, and even more preferably not more than 2.0 by 2.0 mm. When the mark-forming features 50 are provided with a raised shape, the raised shape has a height (h in FIG. 7) which, while not subject to any particular limitation, is preferably from 5 to 200 µm, more preferably from 10 to 100 µm, and even more preferably from 20 to 50 µm. On the other hand, when the mark-forming features 50 are provided with a recessed shape, the recessed shape has a depth which, while not subject to any particular limitation, is preferably from 5 to 200 µm, more preferably from 10 to 100 µm, and even more preferably from 20 to 50 µm. The height and depth settings of these mark-forming features 50, regardless of whether the features 50 are raised or recessed, may be adjusted as appropriate so long as the mark-forming features 50 provided on the cavity wall 31 do not catch, thereby preventing the golf ball from being easily removed from the mold cavity after injection molding.

FIG. 9 is a plan view showing the surface of the ball as captured with a camera after the ball has been turned through a given angle and arranged with the seam line 4 at the center; that is, after the ball positioning operation has been carried out. The vertical line at the center of this image frame F is the seam line 4, and the symbol o is the center of the captured image.

The method used to form the above-described mark-forming raised or recessed features in the mold is not subject to any particular limitation. In one exemplary method, mark-forming recessed features and/or raised features are formed on a cavity wall 31 where numerous dimple-forming projections have been formed. In another method, first a master mold provided with numerous recessed features capable of forming dimple-forming projections is fabricated, following which the desired mark shapes are machined into the surface shape of the master mold, then the pattern in the master mold is reversed so as to form a golf ball mold having the desired surface shape on the cavity wall. To fabricate such a mold, a technique may be employed in which, as is commonplace in the art, 3D CAD/CAM is used to directly cut the entire surface shape three-dimensionally into a master mold from which the golf ball mold is subsequently made by pattern reversal, or to directly cut three-dimensionally the cavity wall for the golf ball mold.

The golf ball of the invention is one which, as noted above, has been molded from the golf ball mold of the present invention. As shown in FIG. 2, numerous dimples 3 are formed on the surface 1 of the ball, in addition to which marks 5 which correspond to the above-described mark-forming raised or recessed features 50 are formed on land areas 2 and/or within dimples 3. These marks 5 are arranged on the surface of the ball based on the relative arrangement of the above-described plurality of mark-forming features 50.

Although not illustrated in the diagrams, it is preferable for indicia such as lettering, trade marks and designs to be applied on the seam line of the inventive golf ball. It is therefore advantageous for the indicia applied on the seam line of the ball to be of a size such that the dimension thereof in the direction of the seam is preferably at least five times, and more preferably at least ten times, the dimension in the direction orthogonal thereto (i.e., the longitudinal direction). More specifically, the length in the seam direction is preferably at least 15 mm.

As explained above, the marks 5 formed on the surface 1 of the golf ball are effectively employed in subsequent steps, such as the application of indicia to the surface of the ball and the positioning of the ball for visual inspection. That is, the marks 5 that have been formed on the surface 1 of the ball are identified—typically with an image processing camera and, based on the shape of those marks 5, the direction and position of the seam line on the ball can be determined. A ball positioning operation is then smoothly carried out by using, for example, an orienting means to rotate the ball a specific amount so as to position the seam line in the center.

In the practice of the invention, the core of the golf ball is not subject to any particular limitation. Use can be made of any of a variety of cores, such as a single-layer solid core, a solid core having a plurality of vulcanized rubber layers, a solid core having a plurality of resin layers, or a thread-wound core having a rubber thread layer. In addition, a cover layer can be formed over the above core. The material making up this cover layer is preferably a known thermoplastic resin or thermoplastic elastomer composed primarily of ionomer resin or urethane resin. The cover is not limited to one layer, and may be formed so as to have a multilayer construction of two or more layers. The cover thickness (per layer) may be selected as appropriate for the diameter of the core and the number of cover layers, although the thickness per cover layer is generally from 0.5 to 3.0 mm.

The types and shapes of the numerous dimples 3 formed on the surface 1 of the ball are not subject to any particular limitation, although it is preferable to select circular or non-circular dimples of the same or different types which have a diameter in a range of 1 to 6 mm and a depth of 0.05 to 0.4 mm. These dimples may be arranged on the surface of the ball in any of various patterns, such as a regular dodecahedral, regular icosahedral or regular octahedral arrangement.

The golf ball of the invention is preferably formed to a diameter and weight in accordance with the Rules of Golf, and typically has a diameter of not less than 42.67 mm and a weight of not more than 45.93 g.

Some preferred embodiments of the invention have been described above in detail with reference made to the attached drawings. However, the golf ball and golf ball mold of the invention are not limited to these drawings and embodiments, and various modifications may be made thereto without departing from the gist of the invention. For example, the arrangement, number and shape of the mark-forming raised or recessed features are not limited to those specific in the foregoing embodiments and drawings, and may be suitably modified and selected without departing from the spirit and scope of the invention as disclosed in the accompanying claims.

The golf ball and golf ball mold of the invention help to significantly shorten the work time and improve efficiency by enabling the direction and position of the seam line on the surface of the ball to be easily identified, and by making it possible to more smoothly and advantageously carry out subsequent operations such as visual inspection of the ball and the application of indicia to the surface of the ball.

The invention claimed is:

1. A golf ball manufactured using a mold having a top half and a bottom half, which ball has formed on a surface thereof, near a seam line corresponding to a parting line between the top and bottom halves of the mold, a raised and/or recessed mark serving as an indicator for detecting the direction or position of the seam line,
    wherein each of a top half of the golf ball and a bottom half of the golf ball have no more than six marks,
    wherein the mark has a height or depth of 5 to 200 μm,
    wherein a raised mark is formed within a dimple on the surface of the ball and has a height set so that the mark does not extend above an edge of the dimple.

2. The golf ball of claim 1 having one or more mark on top and bottom portions of the ball on either side of the seam line.

3. The golf ball of claim 1 wherein, if the seam line represents 0° latitude, the mark is disposed on the golf ball surface within a range in latitude of 1° to 45°.

4. The golf ball of claim 1 which is divided into two hemispheres by the seam line, wherein marks on the respective hemispheres are disposed so as to be substantially equally spaced apart relative to an axis of rotation circumscribed by the seam line.

5. The golf ball of claim 1, wherein the mark comprises one simple symbol.

6. The golf ball of claim 1, wherein the mark has a shape which follows the shape of a dimple and/or land area on the ball.

7. The golf ball of claim 1 which is divided into a first and a second hemisphere by the seam line, wherein marks on the first hemisphere exist in a relative arrangement with marks on the second hemisphere such that the marks on the first hemisphere are separated from the marks on the second hemisphere at a given angle of from 20° to 40° relative to an axis of rotation circumscribed by the seam line.

8. The golf ball of claim 1, wherein the mark has a size of at most 4.0 mm by 4.0 mm.

9. The golf ball of claim 1, wherein the mark has a shape selected from the group consisting of a letter "T", an angular letter "U", a triangle, an arrow and a cross.

10. A golf ball manufactured using a mold having a top half and a bottom half, which ball has formed on a surface thereof, near a seam line corresponding to a parting line between the top and bottom halves of the mold, a raised and/or recessed mark serving as an indicator for detecting the direction or position of the seam line,
    wherein the golf ball is divided into a first and a second hemisphere by the seam line, wherein marks on the first hemisphere exist in a relative arrangement with marks on the second hemisphere such that the marks on the first hemisphere are separated from the marks on the second hemisphere at a given angle of from 20° to 40° relative to an axis of rotation circumscribed by the seam line.

11. The golf ball of claim 10 having one or more mark on top and bottom portions of the ball on either side of the seam line.

12. The golf ball of claim 10 wherein, if the seam line represents 0° latitude, the mark is disposed on the golf ball surface within a range in latitude of 1° to 45°.

13. The golf ball of claim 10 which is divided into two hemispheres by the seam line, wherein marks on the respective hemispheres are disposed so as to be substantially equally spaced apart relative to an axis of rotation circumscribed by the seam line.

14. The golf ball of claim 10, wherein the mark is formed on a surface of a dimple and/or land area on the ball.

15. The golf ball of claim 10, wherein the mark comprises one simple symbol.

16. The golf ball of claim 10, wherein the mark has a height or depth of 5 to 200 μm.

17. The golf ball of claim 10, wherein the mark has a shape which follows the shape of a dimple and/or land area on the ball.

18. A golf ball manufactured using a mold having a top half and a bottom half, which ball has formed on a surface thereof, near a seam line corresponding to a parting line between the top and bottom halves of the mold, a raised and/or recessed mark serving as an indicator for detecting the direction or position of the seam line,
    wherein the mark has a size of at most 4.0 mm by 4.0 mm,
    wherein the mark is formed on a surface of a dimple.

19. The golf ball of claim 18 having one or more mark on top and bottom portions of the ball on either side of the seam line.

20. The golf ball of claim 18 wherein, if the seam line represents 0° latitude, the mark is disposed on the golf ball surface within a range in latitude of 1° to 45°.

21. The golf ball of claim 18 which is divided into two hemispheres by the seam line, wherein marks on the respective hemispheres are disposed so as to be substantially equally spaced apart relative to an axis of rotation circumscribed by the seam line.

22. The golf ball of claim 18, wherein the mark comprises one simple symbol.

23. The golf ball of claim 18, wherein the mark has a height or depth of 5 to 200 μm.

24. The golf ball of claim 18, wherein the mark has a shape which follows the shape of a dimple.

25. The golf ball of claim 18, wherein the mark has a shape selected from the group consisting of a letter "T", an angular letter "U", a triangle, an arrow and a cross.

26. A golf ball manufactured using a mold having a top half and a bottom half, which ball has formed on a surface thereof, near a seam line corresponding to a parting line between the top and bottom halves of the mold, a raised and/or recessed mark serving as an indicator for detecting the direction or position of the seam line, wherein a raised mark is formed within a dimple on the surface of the ball and has a height set so that the mark does not extend above an edge of the dimple.

27. The golf ball of claim 26 having one or more mark on top and bottom portions of the ball on either side of the seam line.

28. The golf ball of claim 26 wherein, if the seam line represents 0° latitude, the mark is disposed on the golf ball surface within a range in latitude of 1° to 45°.

29. The golf ball of claim 26 which is divided into two hemispheres by the seam line, wherein marks on the respective hemispheres are disposed so as to be substantially equally spaced apart relative to an axis of rotation circumscribed by the seam line.

30. The golf ball of claim 26, wherein the mark comprises one simple symbol.

31. The golf ball of claim 26, wherein the mark has a height or depth of 5 to 200 μm.

32. The golf ball of claim 26, wherein the mark has a shape which follows the shape of a dimple and/or land area on the ball.

33. The golf ball of claim 26, wherein the mark has a shape selected from the group consisting of a letter "T", an angular letter "U", a triangle, an arrow and a cross.

* * * * *